US 8,983,791 B2

(12) United States Patent
Ohashi et al.

(10) Patent No.: US 8,983,791 B2
(45) Date of Patent: Mar. 17, 2015

(54) CARBON DIOXIDE SEPARATION RECOVERY SYSTEM AND METHOD OF MEASURING AMOUNT OF REBOILER INPUT HEAT

(75) Inventors: Yukio Ohashi, Yokohama (JP); Takashi Ogawa, Yokohama (JP); Hideo Kitamura, Tokyo (JP); Haruhiko Hirata, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 817 days.

(21) Appl. No.: 13/279,041

(22) Filed: Oct. 21, 2011

(65) Prior Publication Data

US 2012/0101767 A1    Apr. 26, 2012

(30) Foreign Application Priority Data

Oct. 22, 2010    (JP) ................................. 2010-237307

(51) Int. Cl.
*B01D 19/00*    (2006.01)
*G06F 15/00*    (2006.01)
(Continued)

(52) U.S. Cl.
CPC ............ *F01K 13/00* (2013.01); *B01D 53/1425* (2013.01); *B01D 53/1475* (2013.01);
(Continued)

(58) Field of Classification Search
CPC ........... B01D 53/1425; B01D 53/1475; B01D 2252/103; B01D 2252/204; B01D 2259/65; B01D 2258/0283; F01K 13/00; Y02C 10/04; Y02C 10/06
USPC ............................................ 702/130; 96/218
See application file for complete search history.

(56) References Cited

U.S. PATENT DOCUMENTS 4,106,916 A * 8/1978 Tuckett et al. ..................... 95/21
6,274,108 B1 * 8/2001 Fujii et al. ..................... 423/228
(Continued)

FOREIGN PATENT DOCUMENTS

JP    S59026926 A    2/1984
JP    H06073387 A    3/1994
(Continued)

OTHER PUBLICATIONS

Sakwattanapong et al., "Behavior of Reboiler Heat Duty for CO2 Capture Plants Using Regenerable Single and Blended Alkanolamines" Ind. Eng. Chem. Res. 2005, 44, 4465-4473.*
(Continued)

*Primary Examiner* — Mohamed Charioui
*Assistant Examiner* — John Kuan
(74) *Attorney, Agent, or Firm* — Patterson & Sheridan, LLP

(57) ABSTRACT

According to one embodiment, a carbon dioxide separation recovery system includes an absorption tower that allows carbon dioxide to be absorbed to an absorption liquid, a regeneration tower that regenerates the absorption liquid, a reboiler that heats the absorption liquid of the regeneration tower, using a heating medium, and a measuring device that measures an amount of heat supplied to the absorption liquid from the heating medium. The measuring device includes a cooler that cools the heating medium discharged from the reboiler, and obtains the amount of heat that is supplied to the absorption liquid from the heating medium by subtracting an amount of heat that is retained by the heating medium cooled by the cooler and an amount of heat, which is removed from the heating medium in the cooler, from an amount of heat that is retained by the heating medium supplied to the reboiler.

10 Claims, 3 Drawing Sheets

(51) Int. Cl.
  *F01K 13/00*  (2006.01)
  *B01D 53/14*  (2006.01)
(52) U.S. Cl.
  CPC ..... *B01D2252/103* (2013.01); *B01D 2252/204* (2013.01); *B01D 2258/0283* (2013.01); *Y02C 10/04* (2013.01); *Y02C 10/06* (2013.01); *B01D 2259/65* (2013.01)
  USPC ............................................ 702/130; 96/218

(56) References Cited

U.S. PATENT DOCUMENTS

| | | | |
|---|---|---|---|
| 7,488,463 B2* | 2/2009 | Iijima et al. | 423/220 |
| 8,303,685 B2* | 11/2012 | Schubert et al. | 95/181 |
| 2006/0178259 A1* | 8/2006 | Schubert et al. | 502/56 |
| 2007/0221065 A1* | 9/2007 | Aroonwilas et al. | 96/243 |
| 2007/0283813 A1* | 12/2007 | Iijima et al. | 96/235 |
| 2010/0003177 A1* | 1/2010 | Aroonwilas et al. | 423/229 |
| 2010/0050637 A1* | 3/2010 | Yamashita et al. | 60/653 |
| 2010/0258005 A1* | 10/2010 | Oishi et al. | 95/156 |
| 2011/0250120 A1* | 10/2011 | Tsubone et al. | 423/437.1 |
| 2012/0063975 A1* | 3/2012 | Koss et al. | 423/220 |
| 2013/0269525 A1* | 10/2013 | Alix et al. | 95/159 |

FOREIGN PATENT DOCUMENTS

| | | |
|---|---|---|
| JP | H10165761 A | 6/1998 |
| JP | 2011042554 A | 3/2011 |
| JP | 2011177684 A | 9/2011 |
| JP | 2011240321 A | 12/2011 |
| JP | 2012035214 A | 2/2012 |

OTHER PUBLICATIONS

Japanese Office Action dated Mar. 4, 2014, filed in Japanese counterpart Application No. 2010-237307, 4 pages (with translation).
Australian Office Action dated Oct. 9, 2012 filed in Australian Counterpart Application No. 2011232812, 4 pages.

* cited by examiner

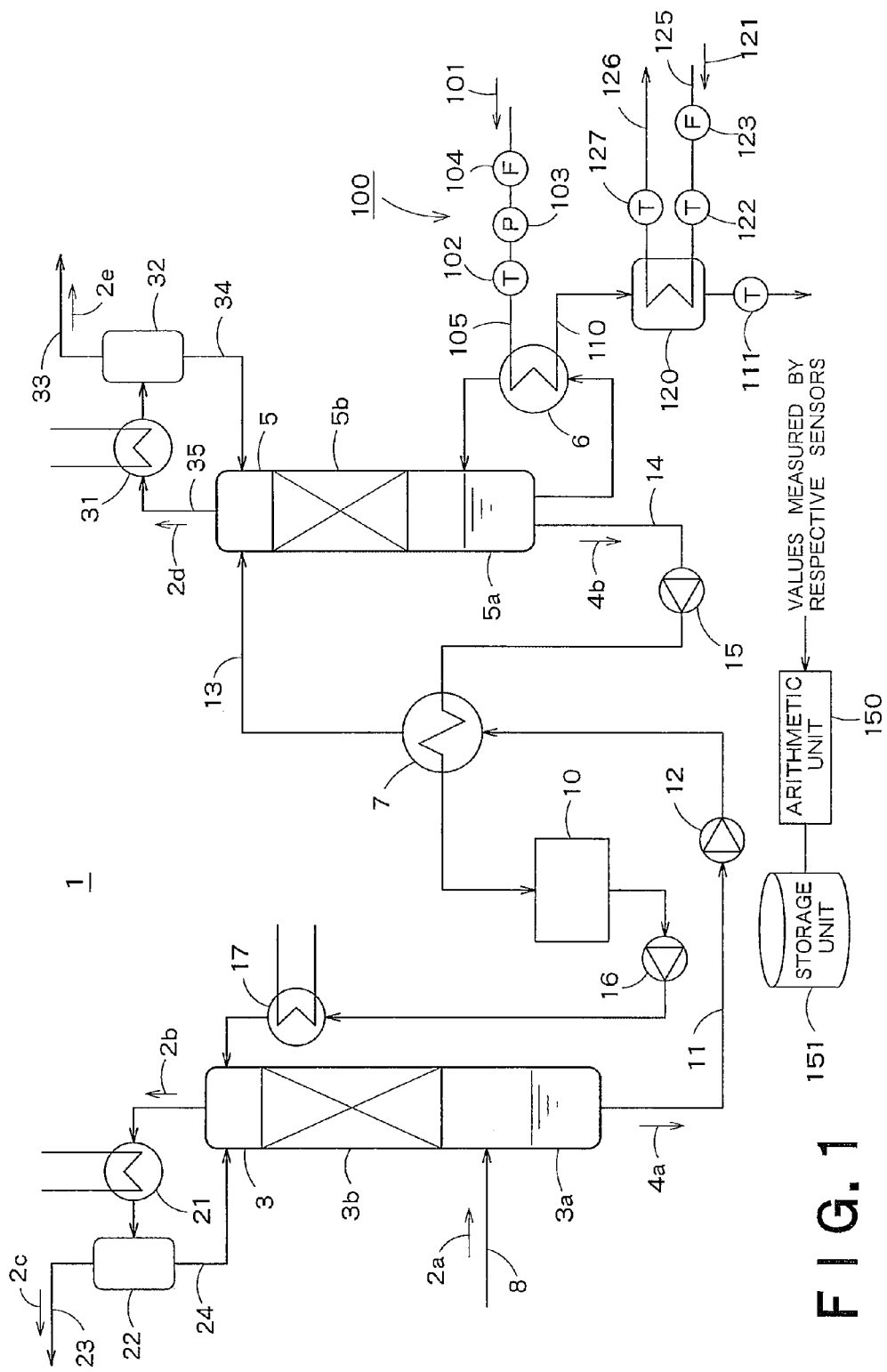
F I G. 1

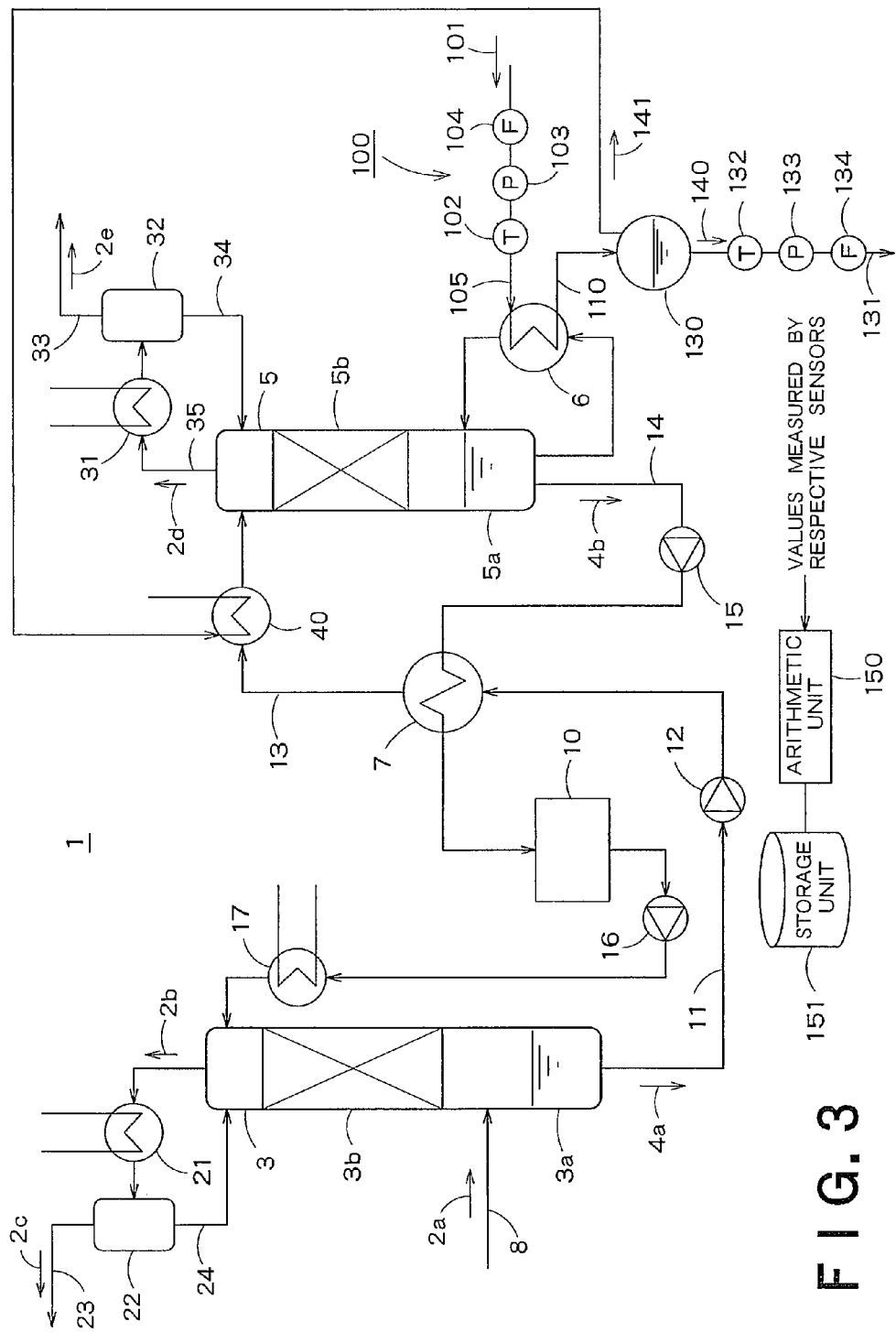
F I G. 3

CARBON DIOXIDE SEPARATION RECOVERY SYSTEM AND METHOD OF MEASURING AMOUNT OF REBOILER INPUT HEAT

CROSS REFERENCE TO RELATED APPLICATION

This application is based upon and claims benefit of priority from the Japanese Patent Application No. 2010-237307, filed on Oct. 22, 2010, the entire contents of which are incorporated herein by reference.

FIELD

Embodiments described herein relate generally to a carbon dioxide separation recovery system and a reboiler input heat amount measuring method.

BACKGROUND

In recent years, in connection with thermal power plants using a large amount of fossil fuel, study has been continued on a method of separating and recovering carbon dioxide contained in a combustion exhaust gas by allowing the combustion exhaust gas and an amine-based absorption liquid to come into contact with each other and a method of storing the recovered carbon dioxide instead of discharging the recovered carbon dioxide.

Specifically, there is known a carbon dioxide recovery system that includes an absorption tower and a regeneration tower. In the carbon dioxide recovery system, the absorption tower allows carbon dioxide contained in a combustion exhaust gas to be absorbed to an amine-based absorption liquid, and the regeneration tower is supplied with an absorption liquid (rich liquid) having carbon dioxide absorbed thereto, from the absorption tower, and recycles the absorption liquid by discharging a carbon dioxide gas from the rich liquid through the heating of the rich liquid. The carbon dioxide recovery system supplies the recycled absorption liquid (lean liquid) to the absorption tower to reuse the recycled absorption liquid (lean liquid).

In a step of discharging carbon dioxide from the rich liquid, a reboiler disposed near the regeneration tower circulates and heats the absorption liquid in the regeneration tower. A part of water vapor, which is generated to be used in a thermal power plant, a factory, or the like, is often supplied to the reboiler as a heating medium. In this case, the amount of heat, which is supplied to the absorption liquid of the regeneration tower from the heating medium of the reboiler, is determined from a difference between the amount of heat of water vapor at the inlet of the reboiler and the amount of heat of water at the outlet of the reboiler. The amount of heat of water vapor at the inlet of the reboiler is calculated from the product of the amount (enthalpy: kJ/kg) of heat retained per unit weight, which is determined through the measurement of temperature and pressure of water vapor, and the mass flow rate (kg/sec) of water vapor. Further, the amount of heat of water at the outlet of the reboiler is calculated from the product of the amount (enthalpy: kJ/kg) of heat retained per unit weight, which is determined through the measurement of temperature and pressure of water, and the mass flow rate (kg/sec) of water.

However, a part of the water vapor supplied to the reboiler does not condense (does not change into water), but remains in the form of water vapor. That is, a fluid existing at the outlet of the reboiler is a gas-liquid two-phase fluid where water vapor and water coexist. Moreover, a ratio between the flow rates of water vapor and water varies depending on the operating conditions of the carbon dioxide recovery system. A method of accurately measuring the ratio between the flow rates of water vapor and water has not been established.

For this reason, it was difficult to accurately measure the amount of heat, which is supplied to the absorption liquid of the regeneration tower from the heating medium of the reboiler, with the above-mentioned method in the related art that determines a difference between the amount of water vapor at the inlet of the reboiler and the amount of heat of water at the outlet of the reboiler.

BRIEF DESCRIPTION OF THE DRAWINGS

FIG. 1 is a diagram illustrating a schematic structure of a carbon dioxide separation recovery system according to a first embodiment of the invention;

FIG. 3 is a diagram illustrating a schematic structure of a carbon dioxide separation recovery system according to a third embodiment of the invention.

DETAILED DESCRIPTION

Figure 2:
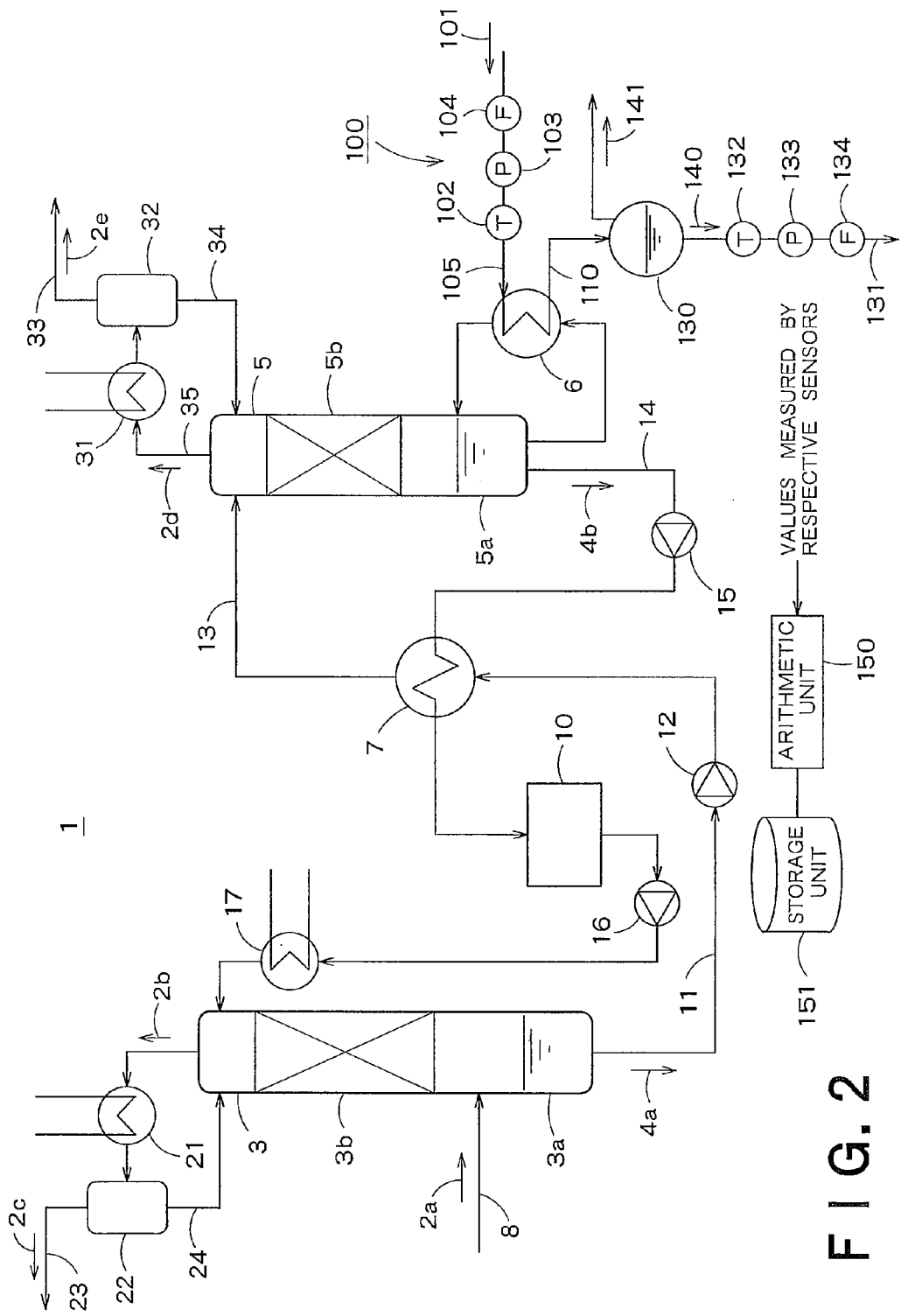
FIG. 2 is a diagram illustrating a schematic structure of a carbon dioxide separation recovery system according to a second embodiment of the invention.

According to one embodiment, a carbon dioxide separation recovery system includes an absorption tower that allows carbon dioxide contained in a combustion exhaust gas to be absorbed to an absorption liquid, a regeneration tower that regenerates the absorption liquid, a reboiler that is connected to the regeneration tower and heats the absorption liquid of the regeneration tower, using a heating medium, and a measuring device that measures an amount of heat supplied to the absorption liquid from the heating medium. The measuring device includes a cooler that cools the heating medium discharged from the reboiler, and obtains the amount of heat that is supplied to the absorption liquid from the heating medium by subtracting an amount of heat that is retained by the heating medium cooled by the cooler and an amount of heat, which is removed from the heating medium in the cooler, from an amount of heat that is retained by the heating medium supplied to the reboiler.

Embodiments of the invention will be described below with reference to the drawings.

First Embodiment

FIG. 1 is a diagram illustrating the schematic structure of a carbon dioxide separation recovery system according to a first embodiment of the invention. Here, the carbon dioxide separation recovery system recovers carbon dioxide, which is contained in a combustion exhaust gas generated by the combustion of fossil fuel, by using an absorption liquid that can absorb carbon dioxide.

As shown in FIG. 1, the carbon dioxide separation recovery system 1 includes an absorption tower 3 and a regeneration tower 5. The absorption tower 3 allows carbon dioxide, which is contained in a combustion exhaust gas 2a, to be absorbed in an absorption liquid. The regeneration tower 5 is supplied with the absorption liquid, which has absorbed carbon dioxide, (hereinafter, referred to as a rich liquid 4a) from the absorption tower 3; discharges a carbon dioxide gas, which contains water vapor, from the absorption liquid by heating the rich liquid 4a; discharges an exhaust gas 2d that contains a carbon dioxide gas and water vapor; and regenerates the absorption liquid.

For example, the combustion exhaust gas 2a, which is generated in a power-generating facility such as a thermal power plant, is supplied to the lower portion of the absorption tower 3 through an exhaust gas introduction line 8, and a combustion exhaust gas 2b from which carbon dioxide has been removed is discharged from the top portion of the absorption tower 3.

The absorption tower 3 includes an absorption tower tank 3a for storing the rich liquid 4a that is generated by allowing the absorption liquid to absorb carbon dioxide. Likewise, the regeneration tower 5 includes a regeneration tower tank 5a for storing the absorption liquid that is regenerated by allowing the rich liquid 4a to discharge a carbon dioxide gas (hereinafter, referred to as a lean liquid 4b).

Here, for example, an amine compound aqueous solution, which is obtained by dissolving an amine compound in water, is used as the absorption liquid that can absorb carbon dioxide.

As shown in FIG. 1, the regeneration tower 5 is provided with a reboiler 6. The reboiler 6 allows the temperature of the lean liquid 4b to rise and generates steam by heating a part of the lean liquid 4b, which is stored in the regeneration tower tank 5a, by using a heating medium 101 such as plant steam (water vapor), which is supplied from a power-generating facility, as a heat source. Then, the reboiler 6 supplies the steam to the regeneration tower 5. The reboiler 6 is provided with a reboiler input heat amount measuring device 100 that measures the amount of heat supplied to the absorption liquid (lean liquid 4b) stored in the regeneration tower 5 from the heating medium 101. The details of the reboiler input heat amount measuring device 100 will be described below.

When the lean liquid 4b is heated in the reboiler 6, a carbon dioxide gas is discharged from the lean liquid 4b and supplied to the regeneration tower 5 together with the steam of the absorption liquid. The steam of the absorption liquid ascends in the regeneration tower 5 while passing through a packed bed 5b, and heats the rich liquid 4a. Accordingly, a carbon dioxide gas is discharged from the rich liquid 4a. The packed bed 5b is made of a material that has, for example, the porous structure, the honeycomb structure, or the like, and may have a function of disturbing the absorption liquid that passes through the packed bed 5b.

The exhaust gas 2d, which contains the steam of the absorption liquid and a carbon dioxide gas discharged from the regeneration tower 5, passes through a gas line 35 and the moisture contained in the exhaust gas is condensed by a gas cooler 31. Then, the exhaust gas is separated into a carbon dioxide gas and return water, which contains the component of the absorption liquid, by a gas-liquid separator 32. The carbon dioxide gas 2e separated by the gas-liquid separator 32 is discharged through a recovered carbon dioxide discharge line 33 and stored in a storage facility (not shown). Further, the return water separated by the gas-liquid separator 32 returns to the regeneration tower 5 through a return line 34.

A regenerative heat exchanger 7 is provided between the absorption tower 3 and the regeneration tower 5. The regenerative heat exchanger 7 heats the rich liquid 4a, which is supplied to the regeneration tower 5 from the absorption tower 3, by using the lean liquid 4b, which is supplied to the absorption tower 3 from the regeneration tower 5, as a heat source. Accordingly, the heat of the lean liquid 4b is recovered. Here, when a carbon dioxide gas is discharged from the rich liquid 4a in the regeneration tower 5, the rich liquid 4a is heated by using high-temperature steam, which is supplied from the reboiler 6, as a heat source, as described above. Accordingly, the temperature of the lean liquid 4b, which is supplied to the regenerative heat exchanger 7, is relatively high, and the lean liquid 4b is used as a heat source.

A rich liquid line 11 through which the rich liquid 4a is supplied to the regenerative heat exchanger 7 from the bottom portion of the absorption tower tank 3a is connected between the absorption tower 3 and the regenerative heat exchanger 7. A rich liquid pump 12, which feeds the rich liquid 4a from the absorption tower 3 to the regenerative heat exchanger 7, is provided on the rich liquid line 11.

A rich liquid line 13 through which the rich liquid 4a is supplied to the upper portion of the regeneration tower 5 from the regenerative heat exchanger 7 is connected between the regenerative heat exchanger 7 and the regeneration tower 5.

A lean liquid line 14 through which the lean liquid 4b is supplied to the regenerative heat exchanger 7 from the bottom portion of the regeneration tower tank 5a is connected between the regeneration tower 5 and the regenerative heat exchanger 7. A lean liquid pump 15, which feeds the lean liquid 4b from the regeneration tower 5 to the regenerative heat exchanger 7, is provided on the lean liquid line 14.

The lean liquid 4b from the regenerative heat exchanger 7 is stored in a buffer tank 10. The lean liquid 4b, which is stored in the buffer tank 10, is fed to the upper portion of the absorption tower 3 by a pump 16. An absorption liquid cooler 17 is provided between the pump 16 and the absorption tower 3. The absorption liquid cooler 17 cools the absorption liquid, which is supplied to the absorption tower 3, by using cooling water (cooling medium) as a cooling source.

The absorption liquid, which is supplied to the upper portion of the absorption tower 3, descends toward the absorption tower tank 3a from the upper portion in the absorption tower 3. Meanwhile, the combustion exhaust gas 2a, which is supplied to the absorption tower 3, ascends from the lower portion toward the top portion in the absorption tower 3. For this reason, the absorption liquid and the combustion exhaust gas 2a containing carbon dioxide come into countercurrent contact (direct contact) with each other in a packed bed 3b, so that the absorption liquid absorbs the carbon dioxide contained in the combustion exhaust gas 2a. As a result, the rich liquid 4a is generated. The combustion exhaust gas 2b from which carbon dioxide has been removed is discharged from the top portion of the absorption tower 3, and the rich liquid 4a is stored in the absorption tower tank 3a of the absorption tower 3. The packed bed 3b is made of a material that has, for example, the porous structure, the honeycomb structure, or the like, and may have a function of disturbing the absorption liquid that passes through the packed bed 3b.

After the combustion exhaust gas 2b discharged from the top portion of the absorption tower 3 is cooled by a gas cooler 21 so that the moisture contained in the combustion exhaust gas 2b is condensed, the combustion exhaust gas 2b is separated into an exhaust gas and return water, which contains the component of the absorption liquid, by a gas-liquid separator 22. The exhaust gas 2c separated by the gas-liquid separator 22 is discharged to the outside of the system through an exhaust gas discharge line 23, and the return water returns to the absorption tower 3 through a return line 24.

Next, the reboiler input heat amount measuring device 100 will be described. The reboiler input heat amount measuring device 100 supplies a heating medium 101 such as water vapor to the reboiler 6 through a supply line 105. A temperature sensor 102 that measures the temperature of the heating medium 101, a pressure sensor 103 that measures the pressure of the heating medium 101, and a flow sensor 104 that measures the flow rate of the heating medium 101 are provided on the supply line 105. That is, the temperature sensor 102, the pressure sensor 103, and the flow sensor 104 measure the temperature, the pressure, and the flow rate of the heating medium 101 at an inlet of the reboiler 6.

The heating medium 101, which has supplied heat to the absorption liquid in the reboiler 6, is discharged through a discharge line 110. A cooler 120, which cools the heating medium 101 discharged from the reboiler 6, is provided on the discharge line 110. If the heating medium 101 supplied to the reboiler 6 has been water vapor, the heating medium 101 discharged from the reboiler 6 is a gas-liquid two-phase fluid that contains water (liquid) and water vapor (gas). All of the water vapor, which is contained in the heating medium 101 discharged from the reboiler 6, is condensed by the cooler 120. Accordingly, the heating medium 101, which flows through the discharge line 110 on the downstream side of the cooler 120, becomes water (liquid).

A temperature sensor 111, which measures the temperature of the heating medium 101, is provided on the discharge line 110 on the downstream side of the cooler 120.

A cooling medium 121, which cools the heating medium 101 discharged from the reboiler 6, is supplied to the cooler 120 through a supply line 125. The cooling medium 121 is, for example, water. A temperature sensor 122 that measures the temperature of the cooling medium 121 and a flow sensor 123 that measures the flow rate of the cooling medium 121 are provided on the supply line 125. That is, the temperature sensor 122 and the flow sensor 123 measure the temperature and the flow rate of the cooling medium 121 at an inlet of the cooler 120.

The cooling medium 121, which has cooled the heating medium 101 in the cooler 120, is discharged from the cooler 120 through a discharge line 126. A temperature sensor 127, which measures the temperature of the cooling medium 121 discharged from the cooler 121, is provided on the discharge line 126. That is, the temperature sensor 127 measures the temperature of the cooling medium 121 at an outlet of the cooler 120.

The amount Q of heat, which is supplied to the absorption liquid from the heating medium 101 in the reboiler 6, corresponds to a value obtained by subtracting the amount Qr of heat, which is removed from the heating medium 101 in the cooler 120, from a value of the product (multiplication) of the flow rate (Gi) of the heating medium and a difference between the amount (enthalpy Hi) of heat that is retained per unit weight of the heating medium 101 at the inlet of the reboiler 6 and the amount (enthalpy Hlo) of heat that is retained per unit weight of the heating medium 101 on the downstream side of the cooler 120; and can be represented by the following Expression 1.

$$Q = Gi \times (Hi - Hlo) - Qr \qquad \text{Expression 1:}$$

The amount (enthalpy Hi) of heat, which is retained per unit weight of the heating medium 101 at the inlet of the reboiler 6, can be obtained from a steam table, which is made by Japan Society of Mechanical Engineers or the like, by using values measured by the temperature sensor 102 and the pressure sensor 103. The flow rate (Gi) of the heating medium is a value measured by the flow sensor 104.

Further, the amount (enthalpy Hlo) of heat, which is retained per unit weight of the heating medium 101 on the downstream side of the cooler 120, may be obtained from the values measured by the temperature sensor 111 and the pressure sensor 103.

Furthermore, the amount Qr of heat, which is removed in the cooler 120, may be obtained from the following Expression 2 by using a value Ti that is measured by the temperature sensor 122, a value To that is measured by the temperature sensor 127, a value Gr that is measured by the flow sensor 123, and the specific heat Cpr of the cooling medium 121.

$$Qr = Gr \times Cpr \times (To - Ti) \qquad \text{Expression 2:}$$

Accordingly, it is possible to obtain the amount Q of heat, which is supplied to the absorption liquid from the heating medium 101 in the reboiler 6, by substituting the values, which are measured by the respective sensors, into Expressions 1 and 2.

For example, an arithmetic unit 150 acquires values that are measured by the temperature sensor 102, the pressure sensor 103, the flow sensor 104, the temperature sensor 111, the temperature sensor 122, the flow sensor 123, and the temperature sensor 127; obtains the enthalpy Hi and the enthalpy Hlo with reference to the steam table stored in a storage unit 151; and calculates the amount Q of heat by the calculation of Expressions 1 and 2.

As described above, in this embodiment, the amount (enthalpy: Hlo) of heat retained per unit weight of the heating medium is obtained after all of the heating medium 101 is changed into liquid by condensing the heating medium 101, which is discharged from the reboiler 6, by the cooler 120. Further, the amount Q of heat, which is supplied to the absorption liquid from the heating medium 101 in the reboiler 6, is obtained by subtracting the amount of heat retained by the heating medium 101 on the downstream side of the cooler 120 and the amount Qr of heat, which is removed in the cooler 120, from the amount of heat that is retained by the heating medium 101 at the inlet of the reboiler 6.

For this reason, even though a ratio between the flow rates of the liquid component and the steam component of the heating medium 101 discharged from the reboiler 6 is changed as the operating conditions of the carbon dioxide separation recovery system 1 are changed, it is possible to easily and accurately calculate the amount Q of heat that is supplied to the absorption liquid from the heating medium 101 in the reboiler 6.

Meanwhile, in the above-mentioned embodiment, the flow sensor 104 for measuring the flow rate of the heating medium 101 has been provided on the supply line 105. However, the flow sensor 104 may be provided on the discharge line 110 on the downstream side of the cooler 120. The reason for this is that it is easier to measure the flow rate of liquid than the flow rate of steam (gas).

Further, in the above-mentioned embodiment, a pressure sensor may be provided on the discharge line 110 on the downstream side of the cooler 120 and the amount (enthalpy: Hlo) of heat, which is retained per unit weight of the heating medium 101 on the downstream side of the cooler 120, may be obtained on the basis of the values measured by the pressure sensor and the temperature sensor 111.

Further, in the above-mentioned embodiment, the flow sensor 123 may be provided not on the supply line 125 but on the discharge line 126.

Second Embodiment

FIG. 2 shows the schematic structure of a carbon dioxide separation recovery system according to a second embodiment of the invention. This embodiment is different from the first embodiment shown in FIG. 1 in terms of the structure of a reboiler input heat amount measuring device 100. In FIG. 2, the same portions as those of the first embodiment shown in FIG. 1 are denoted by the same reference numerals. The description thereof will be omitted.

As shown in FIG. 2, a heating medium 101 discharged from a reboiler 6 is supplied to a gas-liquid separator 130 through a discharge line 110. The gas-liquid separator 130 separates a liquid phase component 140 and a gas phase component 141 from the heating medium 101. The gas phase component 141 is discharged from the upper portion of the gas-liquid separator 130. The liquid phase component 140 is gathered at the lower portion of the gas-liquid separator 130 by gravity and discharged through a discharge line 131.

A temperature sensor 132 that measures the temperature of the liquid phase component 140, a pressure sensor 133 that measures the pressure of the liquid phase component 140, and a flow sensor 134 that measures the flow rate of the liquid phase component 140 are provided on the discharge line 131.

The amount Qlo of heat, which is retained by the liquid phase component 140, can be calculated from the following Expression 3.

$$Qlo = Go \times Hlo \quad \text{Expression 3:}$$

Here, the amount (enthalpy Hlo) of heat, which is retained per unit weight of the liquid phase component 140, can be obtained from values that are measured by the temperature sensor 132 and the pressure sensor 133. Further, the flow rate Go of the liquid phase component 140 is a value measured by the flow sensor 134.

The flow rate Gvo of the gas phase component 141, which is discharged from the gas-liquid separator 130, is represented by the following Expression 4 using the flow rate Gi of the heating medium 101 at the inlet of the reboiler 6 (a value measured by the flow sensor 104).

$$Gvo = Gi - Go \quad \text{Expression 4:}$$

The temperature of the gas phase component 141, which is separated by the gas-liquid separator 130, is measured by a temperature sensor 135 and the pressure of the gas phase component 141 is measured by a pressure sensor 136. The amount (enthalpy Hi') of heat, which is retained per unit weight of the gas phase component 141, can be obtained from the values that are measured by the temperature sensor 135 and the pressure sensor 136. The amount Qvo of heat, which is discharged from the gas-liquid separator 130 as the gas phase component 141, is represented by the following Expression 5.

$$Qvo = Gvo \times Hi' \quad \text{Expression 5:}$$

Accordingly, the amount Q of heat, which is supplied to the absorption liquid from the heating medium 101 in the reboiler 6, can be obtained from the following Expression 6.

$$\begin{aligned} Q &= Gi \times Hi - Gvo \times Hi' - Qlo \quad \text{Expression 6} \\ &= Gi \times Hi - (Gi - Go) \times Hi' - Go \times Hlo \\ &= Gi \times (Hi - Hi') + Go \times (Hi' - Hlo) \end{aligned}$$

As described above, according to this embodiment, the temperature and the pressure of the heating medium 101 at the inlet of the reboiler 6 are measured by the temperature sensor 102 and the pressure sensor 103; the temperature, the pressure, and the flow rate of the liquid phase component 140 of the heating medium 101, which is separated by the gas-liquid separator 130, are measured by the temperature sensor 132, the pressure sensor 133, and the flow sensor 134; and the temperature and the pressure of the gas phase component 141 are measured by the temperature sensor 135 and the pressure sensor 136. The measured values are substituted into the above-mentioned Expression 6, so that the amount Q of heat is obtained. That is, the amount Q of heat is obtained by adding a value of the product of the flow rate of the heating medium 101 at the inlet of the reboiler 6 and a difference between the amount of heat retained per unit weight of the gas phase component 141 at the inlet of the reboiler 6 and the amount of heat retained per unit weight of the heating medium 101 at the inlet of the reboiler 6, to a value of the product of the flow rate of the liquid phase component 140 (=the flow rate of the heating medium 101 condensed in the reboiler 6) and a difference between the amount of heat retained per unit weight of the gas phase component 141 and the amount of heat retained per unit weight of the liquid phase component 140.

For this reason, even if a ratio between the flow rates of the liquid component and the steam component of the heating medium 101 discharged from the reboiler 6 is changed as the operating conditions of the carbon dioxide separation recovery system 1 are changed, it is possible to easily and accurately calculate the amount Q of heat that is supplied to the absorption liquid from the heating medium 101 in the reboiler 6.

Meanwhile, since a value measured by the flow sensor 104 is not used in the calculation of the amount Q of heat in this embodiment as appreciated from Expression 6, the flow sensor 104 may not be repeated.

Third Embodiment

FIG. 3 shows the schematic structure of a carbon dioxide separation recovery system according to a third embodiment of the invention. This embodiment is different from the second embodiment shown in FIG. 2 in that a heating device 40 is provided on a rich liquid line 13. In FIG. 3, the same portions as those of the second embodiment shown in FIG. 2 are denoted by the same reference numerals. The description thereof will not be repeated.

The heating device 40 heats a rich liquid 4a by using a gas phase component 141 of a heating medium 101, which is discharged from a gas-liquid separator 130, as a heat source. The rich liquid 4a heated by the heating device 40 is supplied to a regeneration tower 5.

As described above, in this embodiment, the rich liquid 4a is heated by huge latent heat generated when the heating medium 101 (water vapor) is condensed. For this reason, even if the flow rate of the heating medium 101 is lower than that of the rich liquid 4a, it is possible to raise the temperature of the rich liquid 4a and to reduce the amount of heat that is supplied to the regeneration tower 5 from the outside for the purpose of the regeneration of an absorption liquid.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A carbon dioxide separation recovery system comprising:
    an absorption tower that allows carbon dioxide contained in a combustion exhaust gas to be absorbed to an absorption liquid;
    a regeneration tower that is supplied with the absorption liquid having carbon dioxide absorbed, from the absorption tower, discharges a carbon dioxide gas that contains steam from the absorption liquid, regenerates the absorption liquid, and discharges an exhaust gas that contains steam and the discharged carbon dioxide gas;

a regenerative heat exchanger that is provided between the absorption tower and the regeneration tower, and heats the absorption liquid, which has absorbed carbon dioxide and is supplied to the regeneration tower from the absorption tower, by using the regenerated absorption liquid, which is supplied to the absorption tower from the regeneration tower, as a heat source;

a reboiler that is connected to the regeneration tower and heats the absorption liquid of the regeneration tower, using a heating medium; and a measuring device that measures an amount of heat supplied to the absorption liquid from the heating medium, wherein the measuring device includes a cooler that cools the heating medium discharged from the reboiler, and obtains the amount of heat that is supplied to the absorption liquid from the heating medium by subtracting an amount of heat that is retained by the heating medium cooled by the cooler and an amount of heat, which is removed from the heating medium in the cooler, from an amount of heat that is retained by the heating medium supplied to the reboiler.

2. The carbon dioxide separation recovery system according to claim 1, wherein the measuring device includes:
a first temperature sensor that measures a temperature of the heating medium supplied to the reboiler;
a pressure sensor that measures a pressure of the heating medium supplied to the reboiler;
a first flow sensor that measures a flow rate of the heating medium supplied to the reboiler or a flow rate of the heating medium cooled by the cooler; and
a second temperature sensor that measures a temperature of the heating medium cooled by the cooler,
wherein the measuring device obtains an amount of heat retained per unit weight of the heating medium supplied to the reboiler, based on values measured by the first temperature sensor and the pressure sensor, and calculates the amount of heat, which is retained by the heating medium supplied to the reboiler, by the product of the amount of heat retained per unit weight of the heating medium supplied to the reboiler and a value measured by the flow sensor, and
wherein the measuring device obtains an amount of heat retained per unit weight of the heating medium cooled by the cooler based on values measured by the second temperature sensor and the pressure sensor, and calculates the amount of heat, which is retained by the heating medium cooled by the cooler, by the product of the amount of heat retained per unit weight of the heating medium cooled by the cooler and a value measured by the flow sensor.

3. The carbon dioxide separation recovery system according to claim 2, wherein the measuring device includes:
a third temperature sensor that measures a temperature of a cooling medium supplied to the cooler;
a fourth temperature sensor that measures a temperature of the cooling medium discharged from the cooler; and
a second flow sensor that measures a flow rate of the cooling medium supplied to the cooler or a flow rate of the cooling medium discharged from the cooler, wherein the measuring device calculates the amount of heat, which is removed from the heating medium by the cooler, by the product of a value measured by the second flow sensor, a specific heat of the cooling medium, and a difference between a value measured by the third temperature sensor and a value measured by the fourth temperature sensor.

4. The carbon dioxide separation recovery system according to claim 1, wherein the measuring device includes:
a first temperature sensor that measures a temperature of the heating medium supplied to the reboiler;
a first pressure sensor that measures a pressure of the heating medium supplied to the reboiler;
a first flow sensor that measures a flow rate of the heating medium supplied to the reboiler or a flow rate of the heating medium cooled by the cooler;
a second temperature sensor that measures a temperature of the heating medium cooled by the cooler; and
a second pressure sensor that measures a pressure of the heating medium cooled by the cooler,
wherein the measuring device obtains an amount of heat retained per unit weight of the heating medium supplied to the reboiler based on values measured by the first temperature sensor and the first pressure sensor, and calculates the amount of heat, which is retained by the heating medium supplied to the reboiler, by the product of the amount of heat retained per unit weight of the heating medium supplied to the reboiler and a value measured by the first flow sensor, and
wherein the measuring device obtains an amount of heat retained per unit weight of the heating medium cooled by the cooler on the basis of values measured by the second temperature sensor and the second pressure sensor, and calculates the amount of heat, which is retained by the heating medium cooled by the cooler, by the product of the amount of heat retained per unit weight of the heating medium cooled by the cooler and a value measured by the first flow sensor.

5. The carbon dioxide separation recovery system according to claim 4, wherein the measuring device includes:
a third temperature sensor that measures a temperature of a cooling medium supplied to the cooler;
a fourth temperature sensor that measures a temperature of the cooling medium discharged from the cooler; and
a second flow sensor that measures a flow rate of the cooling medium supplied to the cooler or a flow rate of the cooling medium discharged from the cooler,
wherein the measuring device calculates the amount of heat, which is removed from the heating medium by the cooler, by the product of a value measured by the second flow sensor, a specific heat of the cooling medium, and a difference between a value measured by the third temperature sensor and a value measured by the fourth temperature sensor.

6. A carbon dioxide separation recovery system comprising:

an absorption tower that allows carbon dioxide contained in a combustion exhaust gas to be absorbed to an absorption liquid;
a regeneration tower that is supplied with the absorption liquid having carbon dioxide absorbed, from the absorption tower, discharges a carbon dioxide gas containing steam from the absorption liquid, regenerates the absorption liquid, and discharges an exhaust gas containing steam and the discharged carbon dioxide gas;
a regenerative heat exchanger that is provided between the absorption tower and the regeneration tower, and heats the absorption liquid, which has absorbed carbon dioxide and is supplied to the regeneration tower from the absorption tower, using the regenerated absorption liquid, which is supplied to the absorption tower from the regeneration tower, as a heat source;
a reboiler that is connected to the regeneration tower and heats the absorption liquid of the regeneration tower, using a heating medium; and
a measuring device that measures an amount of heat supplied to the absorption liquid from the heating medium,
wherein the measuring device includes:
a first flow sensor that measures a flow rate of the heating medium supplied to the reboiler;
a gas-liquid separator that separates the heating medium discharged from the reboiler into liquid and gas; and
a second flow sensor that measures a flow rate of a liquid phase component discharged from the gas-liquid separator,
wherein the measuring device obtains an amount of heat, which is supplied to the absorption liquid from the heating medium, by adding a value of the product of the flow rate of the heating medium supplied to the reboiler and a difference between an amount of heat retained per unit weight of the heating medium supplied to the reboiler and an amount of heat retained per unit weight of a gas phase component discharged from the gas-liquid separator, to a value of the product of the flow rate of the liquid phase component and a value of a difference between the amount of heat retained per unit weight of the gas phase component and the amount of heat retained per unit weight of the liquid phase component.

7. The carbon dioxide separation recovery system according to claim 6,
wherein the measuring device includes:
a first temperature sensor that measures a temperature of the heating medium supplied to the reboiler;
a first pressure sensor that measures a pressure of the heating medium supplied to the reboiler;
a second temperature sensor that that measures a temperature of the liquid phase component;
a second pressure sensor that measures a pressure of the liquid phase component;
a third temperature sensor that measures a temperature of the gas phase component; and
a third pressure sensor that measures a pressure of the gas phase component,
wherein the measuring device obtains an amount of heat retained per unit weight of the heating medium supplied to the reboiler based on values measured by the first temperature sensor and the first pressure sensor, obtains an amount of heat retained per unit weight of the liquid phase component based on values measured by the second temperature sensor and the second pressure sensor, and obtains an amount of heat retained per unit weight of the gas phase component based on values measured by the third temperature sensor and the third pressure sensor.

8. The carbon dioxide separation recovery system according to claim 6, further comprising:
a heater that heats an absorption liquid supplied to the regeneration tower from the regenerative heat exchanger by using the gas phase component, which is discharged from the gas-liquid separator, as a heat source.

9. A reboiler input heat amount measuring method of measuring an amount of heat supplied to an absorption liquid from a heating medium in a reboiler of a carbon dioxide separation recovery system, the carbon dioxide separation recovery system including:
an absorption tower that allows carbon dioxide contained in a combustion exhaust gas to be absorbed to an absorption liquid;
a regeneration tower that is supplied with the absorption liquid having absorbed carbon dioxide, from the absorption tower, discharges a carbon dioxide gas containing steam from the absorption liquid, regenerates the absorption liquid, and discharges an exhaust gas containing steam and the discharged carbon dioxide gas;
a regenerative heat exchanger that is provided between the absorption tower and the regeneration tower, and heats the absorption liquid, which has absorbed carbon dioxide and is supplied to the regeneration tower from the absorption tower, using the regenerated absorption liquid, which is supplied to the absorption tower from the regeneration tower, as a heat source; and
a reboiler that is connected to the regeneration tower and heats the absorption liquid of the regeneration tower, using a heating medium,
the reboiler input heat amount measuring method comprising:
calculating a first amount of heat retained by the heating medium supplied to the reboiler;
cooling the heating medium, which is discharged from the reboiler, by a cooler;
calculating a second amount of heat retained by the heating medium cooled by the cooler;
calculating an amount of heat removed from the heating medium in the cooler; and
obtaining an amount of heat, which is supplied to the absorption liquid from the heating medium, by subtracting the second amount of heat retained and the amount of heat removed from the first amount of heat retained.

10. A reboiler input heat amount measuring method of measuring an amount of heat supplied to an absorption liquid from a heating medium in a reboiler of a carbon dioxide separation recovery system, the carbon dioxide separation recovery system including:
an absorption tower that allows carbon dioxide contained in a combustion exhaust gas to be absorbed to an absorption liquid;
a regeneration tower that is supplied with the absorption liquid having carbon dioxide absorbed, from the absorption tower, discharges a carbon dioxide gas containing steam from the absorption liquid, regenerates the absorption liquid, and discharges an exhaust gas containing steam and the discharged carbon dioxide gas;
a regenerative heat exchanger that is provided between the absorption tower and the regeneration tower, and heats the absorption liquid, which has absorbed carbon dioxide and is supplied to the regeneration tower from the absorption tower, using the regenerated absorption liquid, which is supplied to the absorption tower from the regeneration tower, as a heat source; and
a reboiler that is connected to the regeneration tower and heats the absorption liquid of the regeneration tower, using a heating medium, the reboiler input heat amount measuring method comprising:
calculating a first amount of heat retained per unit weight of the heating medium supplied to the reboiler;
separating the heating medium, which is discharged from the reboiler, into liquid and gas by a gas-liquid separator;

calculating a second amount of heat retained per unit weight of a liquid phase component discharged from the gas-liquid separator;
calculating a third amount of heat retained per unit weight of a gas phase component discharged from the gas-liquid separator;
measuring a first flow rate of the heating medium supplied to the reboiler;
measuring a second flow rate of the liquid phase component; and
obtaining the amount of heat, which is supplied to the absorption liquid from the heating medium, by adding a value of the product of the first flow rate and a difference between the first amount of heat retained and the third amount of heat retrained per unit weight to a value of the product of the second flow rate and a difference between the third amount of heat retained and the second amount of heat retained per unit weight.

\* \* \* \* \*